US012624645B2

(12) United States Patent
Vondrell et al.

(10) Patent No.: US 12,624,645 B2
(45) Date of Patent: May 12, 2026

(54) ACTIVE CLEARANCE CONTROL ASSEMBLY

(71) Applicants: General Electric Company, Schenectady, NY (US); GE Avio S.r.l., Rivalta di Torino (IT)

(72) Inventors: Randy M. Vondrell, Cincinnati, OH (US); Kevin William Caldwell, Maineville, OH (US); John Carl Glessner, Kings Mills, OH (US); Javier Barba Fuentes, Queretaro (MX); Dorota Kopkowicz, Bielsko-Biala (PL)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/354,021

(22) Filed: Jul. 18, 2023

(65) Prior Publication Data

US 2024/0352866 A1 Oct. 24, 2024

(30) Foreign Application Priority Data

Apr. 18, 2023 (PL) ........................................ 444447

(51) Int. Cl.
*F01D 11/24* (2006.01)
*F01D 11/20* (2006.01)

(52) U.S. Cl.
CPC .............. *F01D 11/24* (2013.01); *F01D 11/20* (2013.01); *F05D 2260/213* (2013.01)

(58) Field of Classification Search
CPC .......... F01D 11/20; F01D 11/24; F02K 3/025; F02K 3/077; F05D 2260/213; F02C 7/18
See application file for complete search history.

(56) References Cited

U.S. PATENT DOCUMENTS

| | | | |
|---|---|---|---|
| 4,064,692 | A | 12/1977 | Johnson et al. |
| 4,534,526 | A | 8/1985 | Metzger et al. |
| 4,917,336 | A | 4/1990 | Jacobs et al. |
| 4,934,825 | A | 6/1990 | Martin |
| 4,976,102 | A | 12/1990 | Taylor |

(Continued)

FOREIGN PATENT DOCUMENTS

| | | | |
|---|---|---|---|
| FR | 3081911 | A1 | 12/2019 |
| FR | 3084907 | A1 | 2/2020 |

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.

(Continued)

*Primary Examiner* — Katheryn A Malatek
(74) *Attorney, Agent, or Firm* — Dority & Manning, P.A.

(57) ABSTRACT

A gas turbine engine includes a fan section, an engine inlet, and a fan duct splitter in serial flow order. The fan duct splitter splits an airflow entering the engine inlet from the fan section into a fan duct and a core duct. The core duct includes a compressor section, a combustion section, and a turbine section in serial flow order. A duct assembly is coupled to the fan duct to extract a portion of a fan duct airflow passing through the fan duct and deliver the portion of the fan duct airflow to an active clearance control mechanism of the turbine section.

15 Claims, 11 Drawing Sheets

(56) References Cited

U.S. PATENT DOCUMENTS

| | | | |
|---|---|---|---|
| 5,012,420 | A * | 4/1991 | Walker .................. G01B 21/16 415/118 |
| 5,148,402 | A | 9/1992 | Magliozzi et al. |
| 5,156,353 | A | 10/1992 | Gliebe et al. |
| 5,190,441 | A | 3/1993 | Murphy et al. |
| 5,197,855 | A | 3/1993 | Magliozzi et al. |
| 5,789,678 | A | 8/1998 | Pla |
| 6,341,747 | B1 | 1/2002 | Schmidt et al. |
| 7,578,132 | B2 | 8/2009 | Webster |
| 8,011,613 | B2 | 9/2011 | Belleville |
| 8,083,482 | B2 | 12/2011 | Serven et al. |
| 8,087,607 | B2 | 1/2012 | Moore et al. |
| 8,186,617 | B2 | 5/2012 | Llamas Sandin |
| 8,196,860 | B2 | 6/2012 | Gall et al. |
| 8,210,798 | B2 | 7/2012 | Stern |
| 8,220,586 | B2 | 7/2012 | Todorovic |
| 8,240,609 | B2 | 8/2012 | Parazzoli et al. |
| 8,307,662 | B2 | 11/2012 | Turco |
| 8,350,398 | B2 | 1/2013 | Butt |
| 8,550,397 | B2 | 10/2013 | Verde Preckler et al. |
| 8,690,106 | B1 | 4/2014 | Reissig |
| 8,967,967 | B2 | 3/2015 | Stretton et al. |
| 9,057,329 | B2 | 6/2015 | Weir et al. |
| 9,102,397 | B2 | 8/2015 | Wood |
| 9,464,594 | B2 | 10/2016 | Pesyna |
| 9,527,578 | B2 | 12/2016 | Towkan |
| 9,540,094 | B2 | 1/2017 | Negulescu et al. |
| 9,677,501 | B2 | 6/2017 | Pierluissi et al. |
| 9,725,155 | B2 | 8/2017 | Miller et al. |
| 9,745,051 | B2 | 8/2017 | Tantot et al. |
| 9,758,254 | B2 | 9/2017 | Moore et al. |
| 9,845,768 | B2 | 12/2017 | Pesyna et al. |
| 9,856,745 | B2 | 1/2018 | Ali |
| 9,890,657 | B2 | 2/2018 | Ali |
| 9,920,710 | B2 | 3/2018 | Dawson et al. |
| 10,118,710 | B2 | 11/2018 | Derrez et al. |
| 10,131,441 | B2 | 11/2018 | Edwards et al. |
| 10,190,506 | B2 | 1/2019 | Ruberte Sanchez |
| 10,202,865 | B2 | 2/2019 | Breeze-Stringfellow et al. |
| 10,364,750 | B2 | 7/2019 | Rambo |
| 10,370,086 | B2 | 8/2019 | Vion et al. |
| 10,371,090 | B2 | 8/2019 | Lovett et al. |
| 10,378,452 | B1 | 8/2019 | Barmichev et al. |
| 10,399,664 | B2 | 9/2019 | Bowden et al. |
| 10,400,710 | B2 | 9/2019 | Dawson et al. |
| 10,414,486 | B2 | 9/2019 | Wood et al. |
| 10,414,497 | B2 | 9/2019 | Velez De Mendizabal Alonso et al. |
| 10,443,622 | B2 | 10/2019 | Rasmussen |
| 10,669,881 | B2 | 6/2020 | Breeze-Stringfellow et al. |
| 10,787,996 | B2 | 9/2020 | Kupratis et al. |
| 2008/0245925 | A1 | 10/2008 | Udall |
| 2012/0195739 | A1 | 8/2012 | Kingan |
| 2013/0115083 | A1 | 5/2013 | Vuillemin |
| 2014/0077116 | A1* | 3/2014 | Walker Santiago .. F01D 17/141 251/324 |
| 2014/0248116 | A1 | 9/2014 | Ali |
| 2014/0263737 | A1 | 9/2014 | Pierluissi et al. |
| 2015/0252683 | A1* | 9/2015 | Hasting ..................... F02C 6/08 415/176 |
| 2015/0291276 | A1 | 10/2015 | Zatorski et al. |
| 2015/0344127 | A1 | 12/2015 | Wood et al. |
| 2016/0010487 | A1 | 1/2016 | Breeze-Stringfellow et al. |
| 2016/0333729 | A1 | 11/2016 | Miller et al. |
| 2016/0333734 | A1 | 11/2016 | Bowden et al. |
| 2016/0368592 | A1 | 12/2016 | Szymandera |
| 2017/0002688 | A1 | 1/2017 | Beutin et al. |
| 2017/0159571 | A1 | 6/2017 | Sidelkovskiy |
| 2017/0225773 | A1 | 8/2017 | Wood et al. |
| 2018/0065727 | A1 | 3/2018 | Gruber et al. |
| 2018/0079492 | A1 | 3/2018 | Seidel et al. |
| 2018/0127084 | A1 | 5/2018 | Tajan et al. |
| 2018/0354634 | A1 | 12/2018 | Jodet et al. |
| 2021/0108597 | A1* | 4/2021 | Ostdiek .................. B64D 27/10 |
| 2023/0220815 | A1 | 7/2023 | Ostdiek et al. |

OTHER PUBLICATIONS

Gazzaniga et al., Wind Tunnel Performance Results of Swiri Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM. 092) Dec. 21, 2015., 96 Pages.

* cited by examiner

ACTIVE CLEARANCE CONTROL ASSEMBLY

PRIORITY INFORMATION

The present application claims priority to Polish Patent Application Number P.444447 filed on Apr. 18, 2023.

FIELD

The present subject matter relates generally to components of a gas turbine engine, or more particularly to an active clearance control assembly.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Additionally, optimization of blade tip clearances can lead to better engine performance and efficiency.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
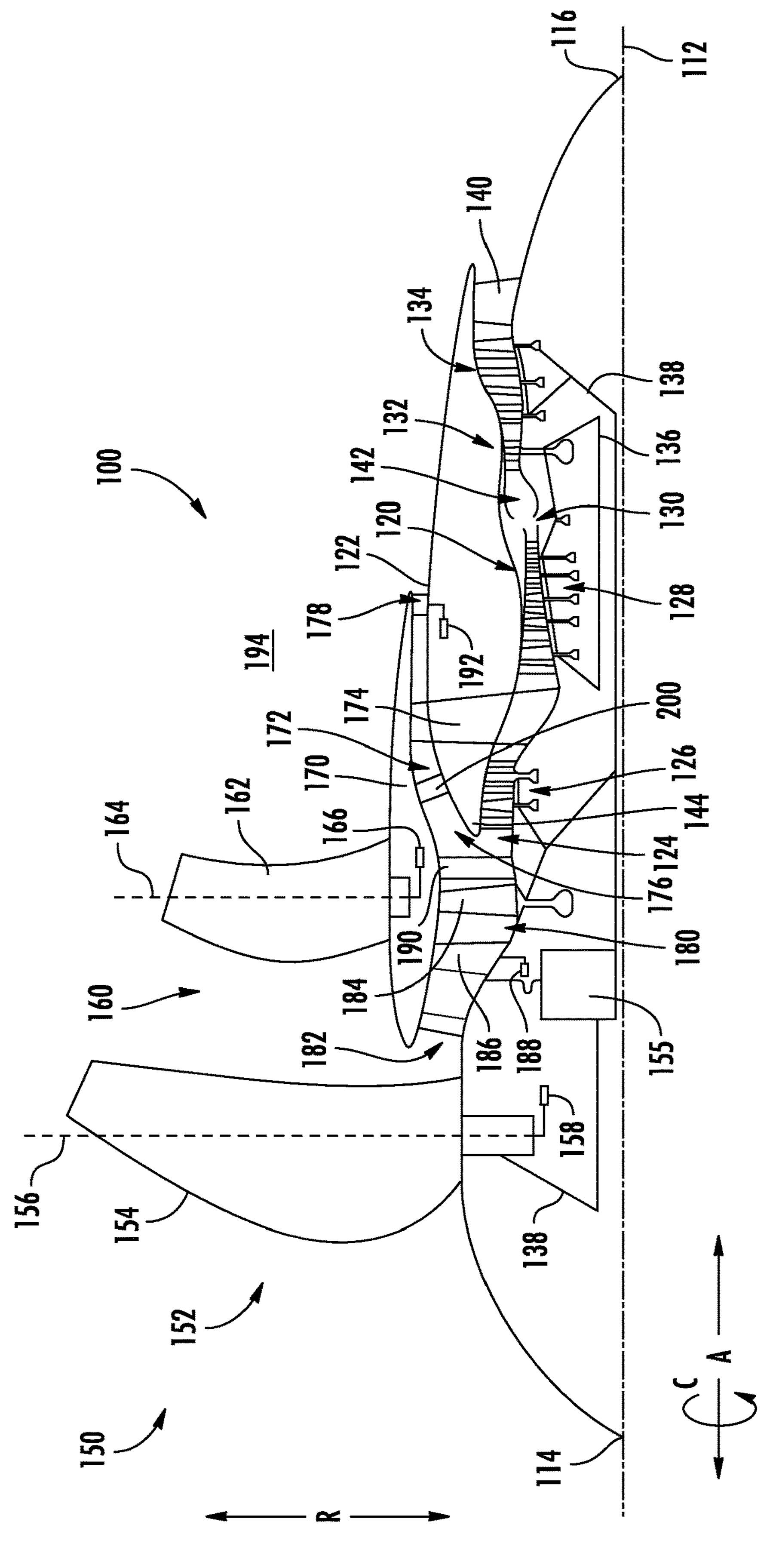
FIG. 1 is a schematic, cross-sectional view of an exemplary, unducted gas turbine engine according to various embodiments of the present subject disclosure.

Repeat use of reference characters in the present specification and drawings is intended to represent the same or analogous features or elements of the present subject matter.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations.

Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms “forward” and “aft” refer to relative positions within a turbomachine, gas turbine engine, or vehicle and refer to the normal operational attitude of the same. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled”, “fixed”, “attached to”, and the like refer to both direct coupling, fixing, or attaching, as well as indirect coupling, fixing, or attaching through one or more intermediate components or features, unless otherwise specified herein.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term “turbomachine” or “turbomachinery” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

In certain aspects of the present disclosure, a three-stream engine includes a turbomachine for compressing an air stream in a compressor and combusting the compressed air stream to generate post-combustion gas. The post-combustion gas is expanded in a turbine section. The three-stream engine includes a fan section, a core engine disposed downstream of the fan section, and a core cowl annularly encasing the core engine and at least partially defining a core duct. A fan cowl is disposed radially outward from the core cowl and annularly encases at least a portion of the core cowl. The fan cowl at least partially defines an inlet duct and a fan duct. The fan duct and the core duct at least partially co-extend axially on opposite sides of the core cowl. Embodiments of an active clearance control (ACC) assembly of the present disclosure provide cooling air from the fan duct to one or more ACC mechanisms associated with the turbine section of the engine. For example, the clearances between the rotating and stationary turbomachinery components of an engine may be adjusted by ACC mechanisms. Thermal control air may be delivered to the ACC mechanism such that the radial position of the casing and shrouds can be adjusted with respect to the tips of the rotating blades. According to exemplary embodiments of the present disclosure, cooling air provided to the ACC mechanisms from the fan duct is generally at a higher pressure. Also, providing cooling air to the ACC mechanisms from the fan duct prevents bleeding cooling air from the core airflow which may otherwise have detrimental combustion penalties.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of airfoils arranged around the longitudinal axis 112 of engine 100, and more particularly includes an array of fan blades 154 (only one shown in FIG. 1) arranged around the longitudinal axis 112 of engine 100. The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a pitch change or central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blade axes 156.

The fan section 150 further includes an array of airfoils positioned aft of the fan blades 154 and also disposed around longitudinal axis 112, and more particularly includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, Fn3S (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Figure 2:
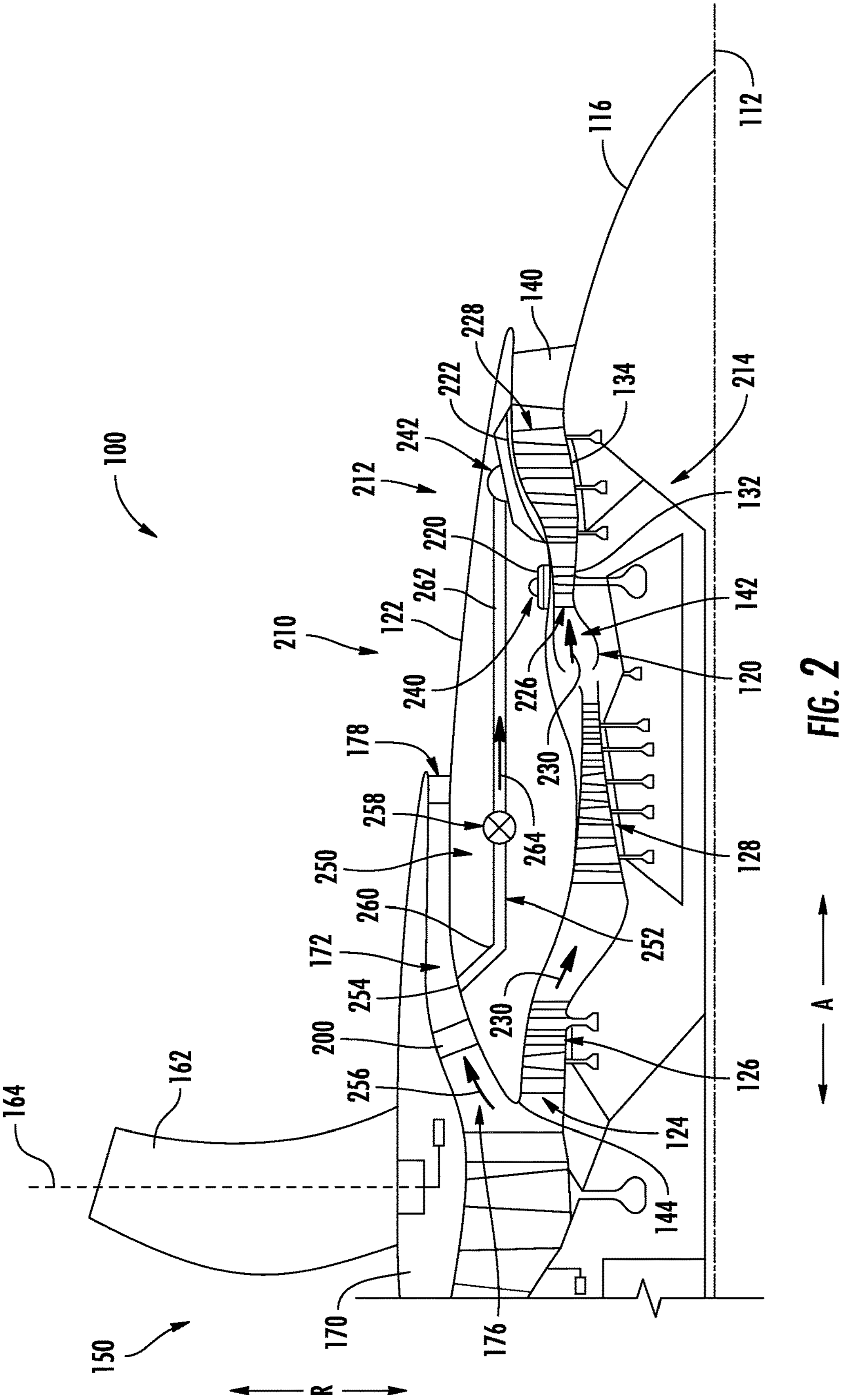
FIG. 2 is a schematic view of an exemplary active clearance control (ACC) assembly according to various embodiments of the present disclosure.

Referring now to FIG. 2, FIG. 2 is a schematic view of an embodiment of an active clearance control (ACC) assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 includes an active clearance control mechanism 212 operably associated with a turbine section 214 of the gas turbine engine 100. For example, as depicted in FIG. 1, the turbine section 214 includes the high pressure turbine 132 and the low pressure turbine 134. The high pressure turbine 132 and the low pressure turbine 134 may include one or more shroud assemblies (not shown) each forming an annular ring about an annular array of rotor blades of the respective high pressure turbine 132 and the low pressure turbine 134. The shroud assemblies may be coupled with hangers (not shown), which are in turn coupled with a respective high pressure turbine casing 220 and a respective low pressure turbine casing 222. In general, shrouds of the shroud assemblies are radially spaced from blade tips of each of an array of rotor blades 226 of the high pressure turbine 132 and an array of rotor blades 228 of the low pressure turbine 134. The shrouds generally reduce clearance and leakage across the blade tips in order to maximize turbine power extracted from a core airflow through the core duct 142 via the rotor blades 226 and 228. A blade tip clearance gap is generally defined between the blade tips and the shrouds. It will be appreciated that engine performance parameters (e.g., thrust, specific fuel consumption (SFC), exhaust gas temperature (EGT), emissions, etc.) are dependent at least in part on the clearance gaps between turbine blade tips and the shrouds of the shroud assemblies. The clearance gaps between the turbine blade tips and shrouds are generally minimized to facilitate optimal engine performance and efficiency. A challenge in minimizing the clearance gaps is that mechanical and thermal loads acting on the turbomachinery components during operation of the engine expand and contract the components at different rates. For example, the rotor and casings surrounding the blades contract and expand at different rates.

Accordingly, the ACC assembly 210 is a system that controls and optimizes clearance gaps throughout the various phases of flight. As will be appreciated, the ACC assembly 210 modulates a flow of relatively cool or hot air from a source of the gas turbine engine 100 and disperses the air on HP and/or LP turbine casings and shrouds to shrink or expand the engine casings relative to the turbine blade tips depending on the operation and flight conditions of the aircraft, among other factors. In this manner, the clearance gaps are adjusted to optimize engine performance.

In the illustrated embodiment, the ACC mechanism 212 includes a HP turbine ACC mechanism 240 and a LP turbine ACC mechanism 242. The HP turbine ACC mechanism 240 controls and optimizes clearance gaps associated with the HP turbine 132, and the LP turbine ACC mechanism 242 controls and optimizes clearance gaps associated with the LP turbine 134. An ACC flowpath 252 is defined by the ACC assembly 210 and is a flowpath for a flow of fluid (e.g., bleed air or extracted air) from the fan duct 172 that flows to and/or through the components of the ACC assembly 210.

In FIG. 2, the ACC assembly 210 includes a duct assembly 250 forming part of the ACC flowpath 252 and thermally connected to the fan duct 172 and the ACC mechanism 212. In FIG. 2, the duct assembly 250 includes an air supply inlet 254 fluidly connected to the fan duct 172 and located downstream of the heat exchanger 200 to extract a portion of a fan duct airflow 256 passing through the fan duct 172. The duct assembly 250 includes a flow control device 258 thermally connected to the ACC flowpath 252 and to the air supply inlet 254. The flow control device 258 is fluidly connected to the air supply inlet 254 via a line 260. Line 260 defines in part ACC flowpath 252. Line 260 is also fluidly connected to and extends from the air supply inlet 254 such that the flow control device 258 is downstream from the air supply inlet 254 in the ACC flow path 252. The flow control device 258 is fluidly connected to the ACC mechanism 212 via a line 262. Line 262 defines in part ACC flowpath 252. Line 262 is also fluidly connected to and extends to the ACC mechanism 212 such that the ACC mechanism 212 is downstream from the flow control device 258 in the ACC flow path 252. In the illustrated embodiment, line 262 is fluidly connected to the LP turbine ACC mechanism 242. The flow control device 258 regulates and/or controls an airflow through the duct assembly 250 to the ACC mechanism 212. For example, in the illustrated embodiment, the flow control device 258 may be a valve regulating an airflow delivered to the LP turbine ACC mechanism 242.

During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. The flow control device 258 controls the volume of the ACC fluid flow 264 delivered to the LP turbine ACC mechanism 242. The LP turbine ACC mechanism 242 uses the ACC fluid flow 264 to control and optimize clearance gaps associated with the LP turbine 134 (e.g., utilizing a system of manifolds, plenums, etc.).

Figure 3:
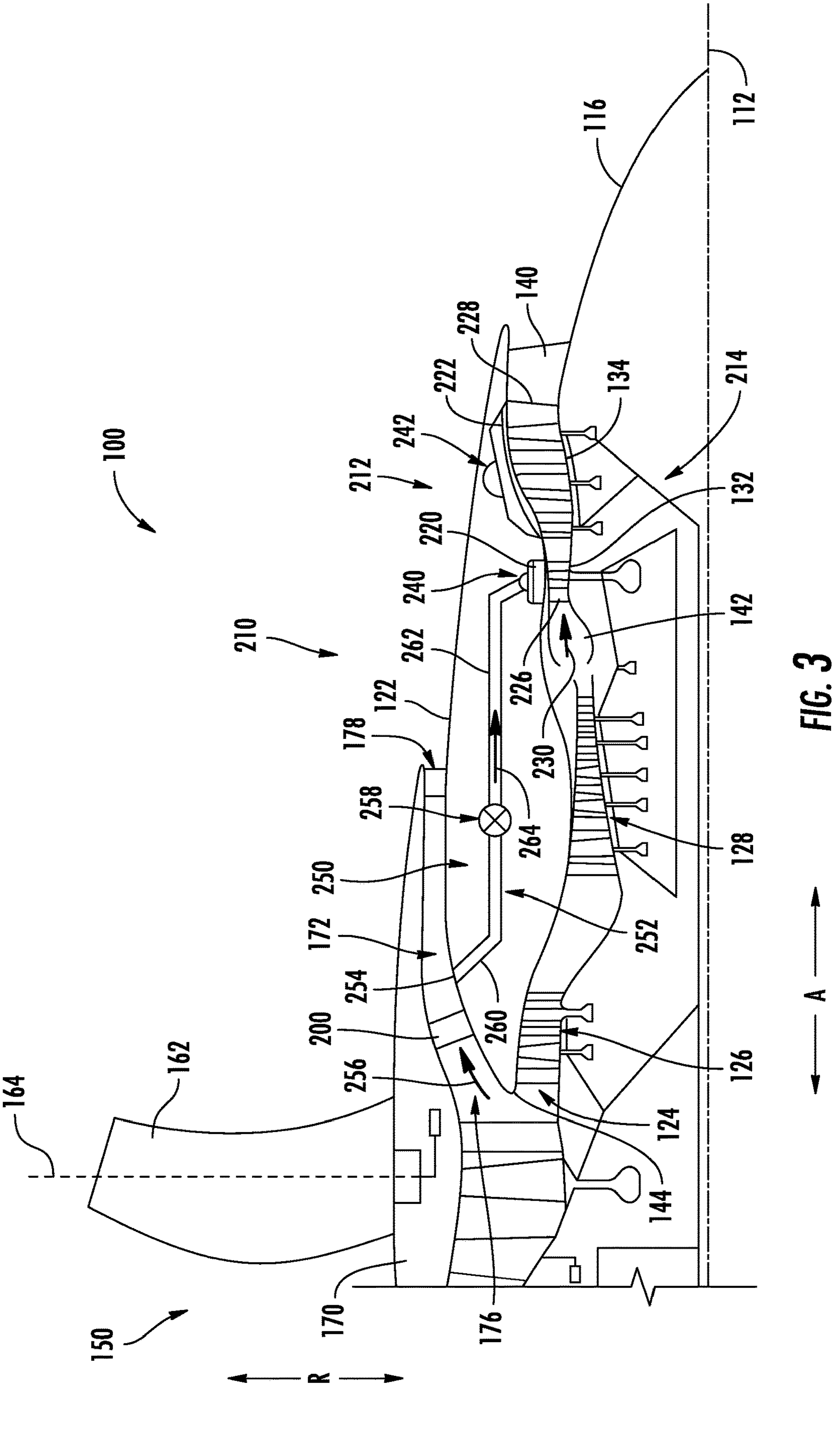
FIG. 3 is a schematic view of another exemplary ACC assembly according to various embodiments of the present disclosure.

Referring now to FIG. 3, FIG. 3 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 2 except line 262 is fluidly connected to the HP turbine ACC mechanism 240. During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. The flow control device 258 controls the volume of the ACC fluid flow 264 delivered to the HP turbine ACC mechanism 240. The HP turbine ACC mechanism 240 uses the ACC fluid flow 264 to control and optimize clearance gaps associated with the HP turbine 132 (e.g., utilizing a system of manifolds, plenums, etc.).

Embodiments of the present disclosure use cooling air for the LP turbine ACC mechanism 242 and/or HP turbine ACC mechanism 240 that has already been used as a heatsink in the heat exchangers 200. Moreover, because the cooling air for the LP turbine ACC mechanism 242 and/or HP turbine ACC mechanism 240 is drawn from the fan duct 172 instead of the core duct 142 (or the fan stream), at lower power and/or cruise conditions, thrust is not affected during peak power conditions.

Figure 4:
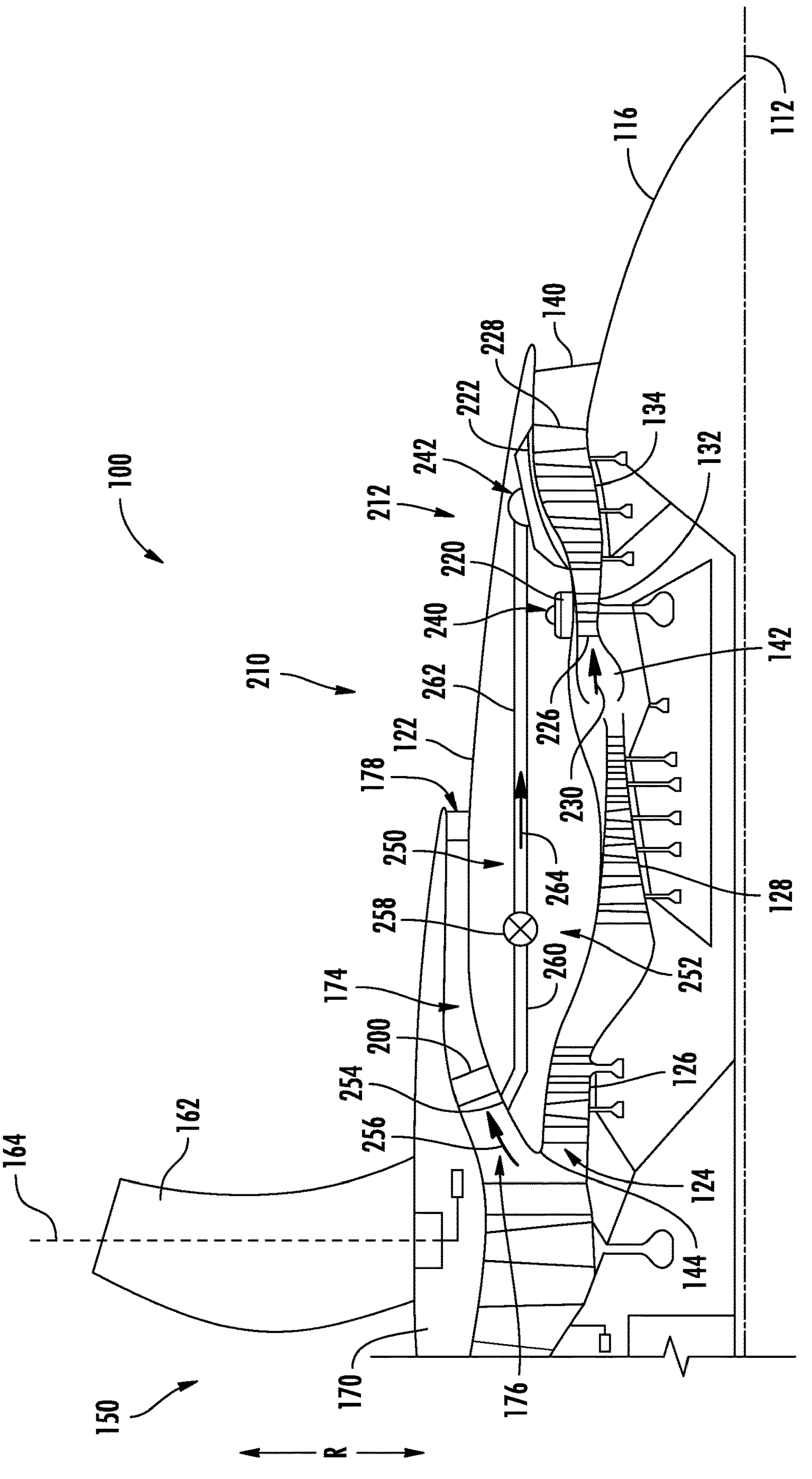
FIG. 4 is a schematic view of another exemplary ACC assembly according to various embodiments of the present disclosure.

Referring now to FIG. 4. FIG. 4 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 2 except the air supply inlet 254 is fluidly connected to the fan duct 172 at a location upstream of the heat exchanger 200. During operation of gas turbine engine 100, a portion of the fan duct airflow 256 is extracted from the fan duct 172 (e.g., by a scoop or other type of mechanism) upstream from the heat exchanger 200 and directed or routed into the air supply inlet 254 as the ACC fluid flow 264. The flow control device 258 controls the volume of the ACC fluid flow 264 delivered to the LP turbine ACC mechanism 242. The LP turbine ACC mechanism 242 uses the ACC fluid flow 264 to control and optimize clearance gaps associated with the LP turbine 134.

Figure 5:
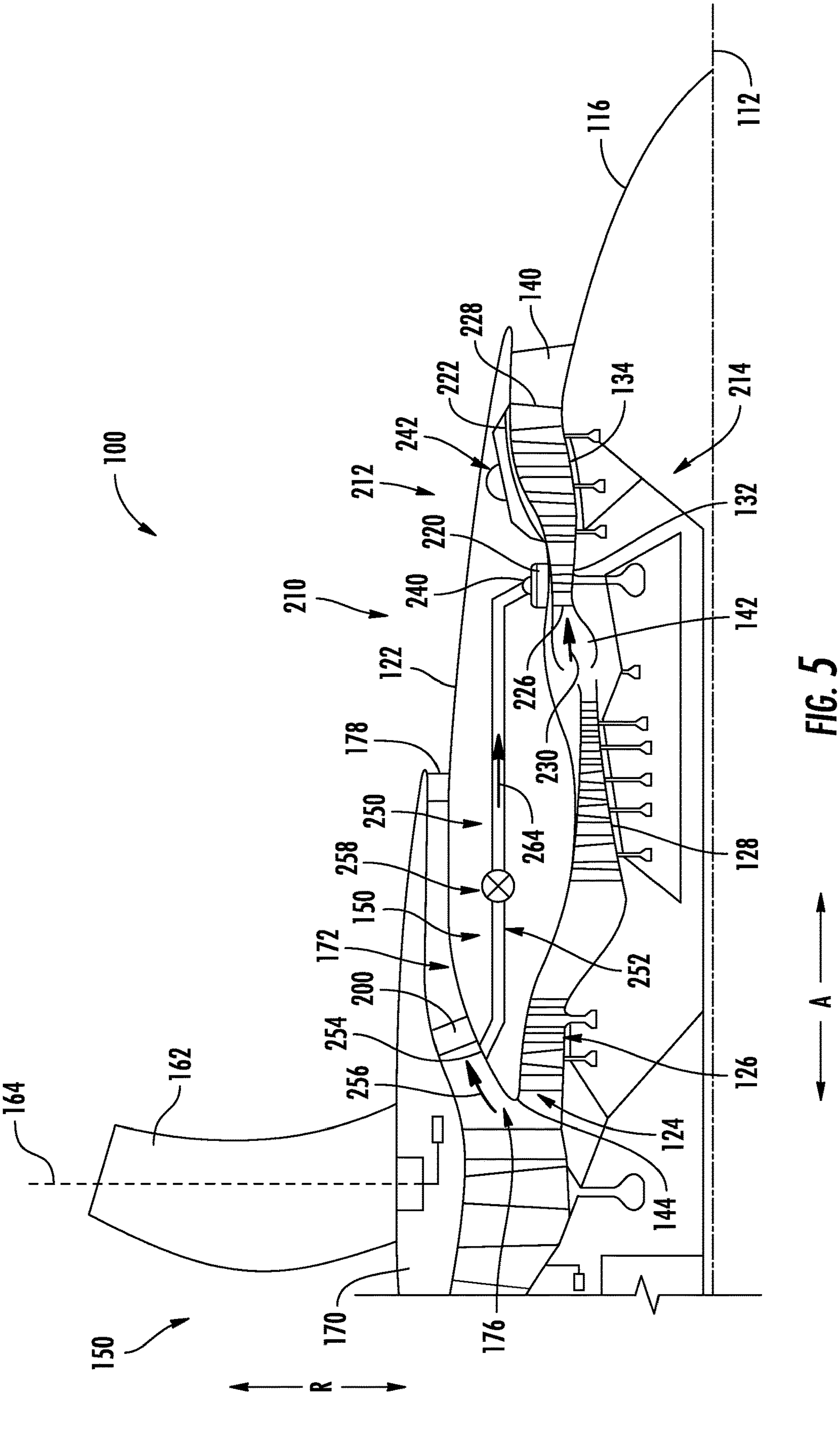
FIG. 5 is a schematic view of another exemplary ACC assembly according to various embodiments of the present disclosure.

Referring now to FIG. 5, FIG. 5 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 4 except line 262 is fluidly connected to the HP turbine ACC mechanism 240. During operation of gas turbine engine 100, a portion of the fan duct airflow 256 is extracted from the fan duct 172 (e.g., by a scoop or other type of mechanism) upstream from the heat exchanger 200 and directed or routed into the air supply inlet 254 as the ACC fluid flow 264. The flow control device 258 controls the volume of the ACC fluid flow 264 delivered to the HP turbine ACC mechanism 240. The HP turbine ACC mechanism 240 uses the ACC fluid flow 264 to control and optimize clearance gaps associated with the HP turbine 132.

Figure 6:
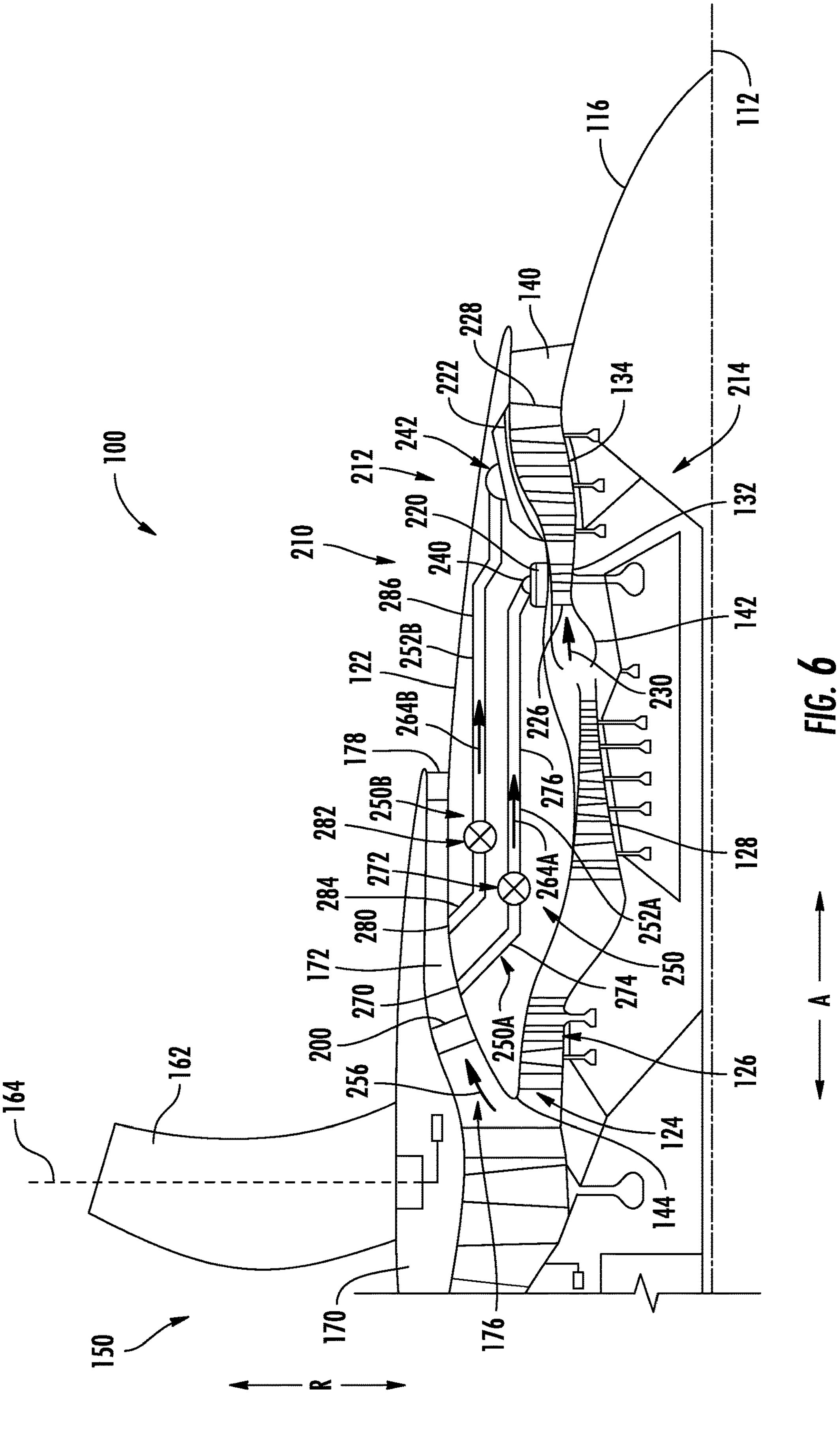
FIG. 6 is a schematic view of another exemplary ACC assembly according to various embodiments of the present disclosure.

Referring now to FIG. 6, FIG. 6 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the duct assembly 250 of the ACC assembly 210 includes a duct assembly 250A forming an ACC flowpath 252A and a duct assembly 250B forming an ACC flowpath 252B. ACC flowpaths 252A and 252B are thermally connected to the fan duct 172.

In the illustrated embodiment, an air supply inlet 270 is fluidly connected to the fan duct 172 and located downstream of the heat exchanger 200 to extract a portion of a fan duct airflow 256 passing through the fan duct 172. The duct assembly 250A includes a flow control device 272 thermally connected to the ACC flowpath 252A and to the air supply inlet 270. The flow control device 272 is fluidly connected to the air supply inlet 270 via a line 274. Line 274 defines in part ACC flowpath 252A. Line 274 is also fluidly connected to and extends from the air supply inlet 270 such that the flow control device 272 is downstream from the air supply inlet 270 in the ACC flow path 252A. The flow control device 272 is fluidly connected to the HP turbine ACC mechanism 240 via a line 276. Line 276 defines in part ACC flowpath 252A. Line 276 is also fluidly connected to and extends to the HP turbine ACC mechanism 240 such that the HP turbine ACC mechanism 240 is downstream from the flow control device 272 in the ACC flow path 252A. The flow control device 272 regulates and/or controls an ACC fluid flow 264A through the duct assembly 250A to the HP turbine ACC mechanism 240. For example, in the illustrated embodiment, the flow control device 272 may be a valve regulating an airflow delivered to the HP turbine ACC mechanism 240.

In FIG. 6, the duct assembly 250B includes an air supply inlet 280 fluidly connected to the fan duct 172 and located downstream of the heat exchanger 200 to extract a portion of a fan duct airflow 256 passing through the fan duct 172. The duct assembly 250B includes a flow control device 282 thermally connected to the ACC flowpath 252B and to the air supply inlet 280. The flow control device 282 is fluidly connected to the air supply inlet 280 via a line 284. Line 284 defines in part ACC flowpath 252B. Line 284 is also fluidly connected to and extends from the air supply inlet 280 such that the flow control device 282 is downstream from the air supply inlet 280 in the ACC flow path 252B. The flow control device 282 is fluidly connected to the LP turbine ACC mechanism 242 via a line 286. Line 286 defines in part ACC flowpath 252B. Line 286 is also fluidly connected to and extends to the LP turbine ACC mechanism 242 such that the LP turbine ACC mechanism 242 is downstream from the flow control device 282 in the ACC flow path 252B. The flow control device 282 regulates and/or controls an ACC fluid flow 264B through the duct assembly 250B to the LP turbine ACC mechanism 242. For example, in the illustrated embodiment, the flow control device 282 may be a valve regulating an airflow delivered to the LP turbine ACC mechanism 242. In the illustrated embodiment, the air supply inlet 280 corresponding to the LP turbine ACC mechanism 242 is located downstream within the fan duct 172 from the air supply inlet 270 associated with the HP turbine ACC mechanism 240. However, it should be appreciated that the upstream/downstream locations for the air supply inlets 270 and 280 may be reversed.

During operation of gas turbine engine 100, a portion of the fan duct airflow 256 is extracted from the fan duct 172 (e.g., by a scoop or other type of mechanism) downstream from the heat exchanger 200 and directed or routed into the air supply inlets 270 and/or 280 as the ACC fluid flows 264A and 264B, respectively. The flow control devices 272 and 282 control the volumes of the ACC fluid flows 264A and 264B delivered to the HP turbine ACC mechanism 240 and the LP turbine ACC mechanism 242, respectively. The HP turbine ACC mechanism 240 uses the ACC fluid flow 264A to control and optimize clearance gaps associated with the HP turbine 132, and LP turbine ACC mechanism 242 uses the ACC fluid flow 264B to control and optimize clearance gaps associated with the LP turbine 134.

Figure 7:
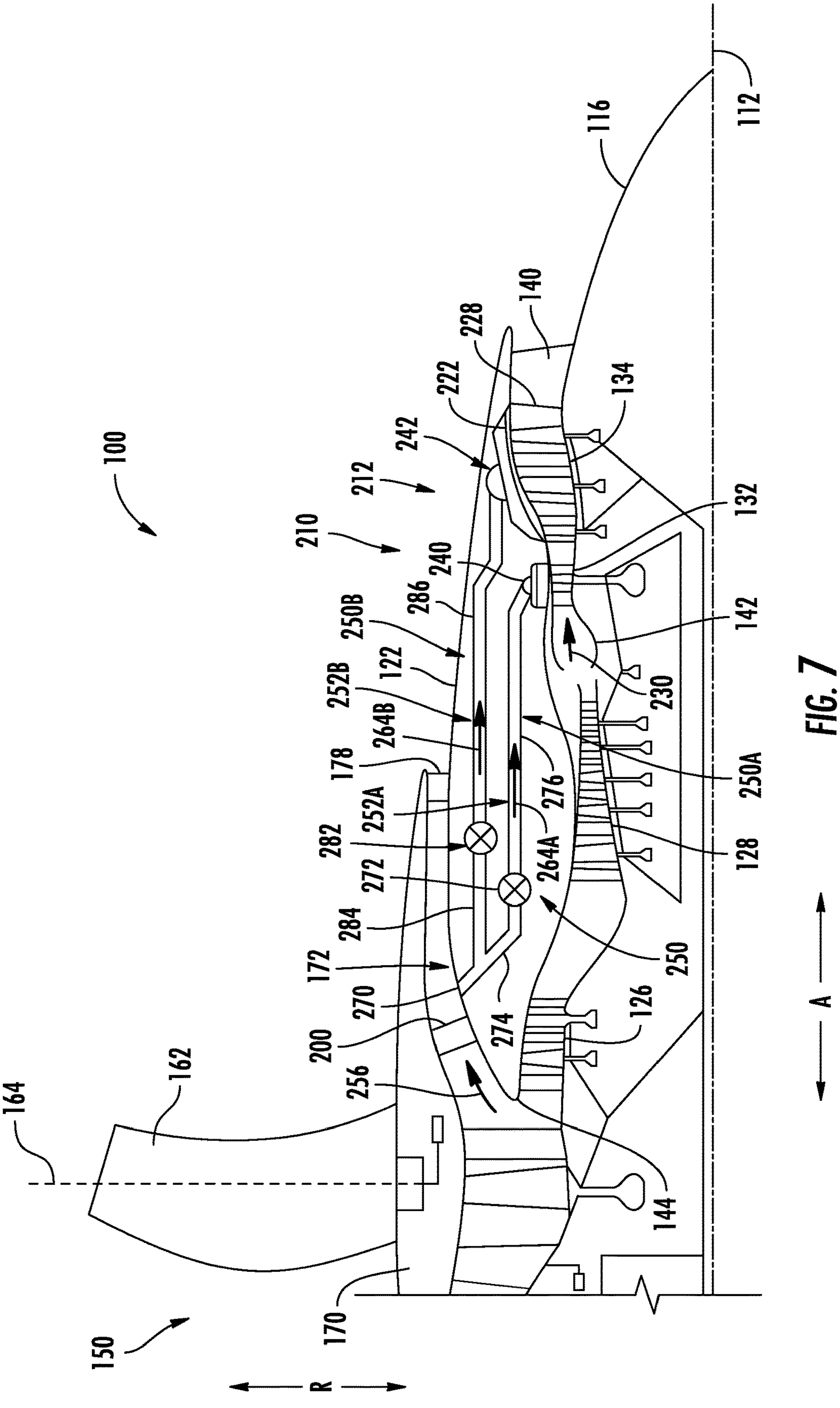
FIG. 7 is a schematic view of another exemplary ACC assembly according to various embodiments of the present disclosure.

Referring now to FIG. 7, FIG. 7 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similar to the embodiment depicted in FIG. 6 except air supply inlet 280 is omitted and the line 284 of the duct assembly 250B is fluidly connected to the line 274. During operation of gas turbine engine 100, a portion of the fan duct airflow 256 is extracted from the fan duct 172 (e.g., by a scoop or other type of mechanism) downstream from the heat exchanger 200 and directed or routed into the air supply inlet 270. Flow control devices 272 and 282 control the volume or flow of the extracted airflow to deliver the extracted airflow as the ACC fluid flows 264A and 264B, respectively. The flow control devices 272 and 282 control the volumes of the ACC fluid flows 264A and 264B delivered to the HP turbine ACC mechanism 240 and the LP turbine ACC mechanism 242, respectively. The HP turbine ACC mechanism 240 uses the ACC fluid flow 264A to control and optimize clearance gaps associated with the HP turbine 132, and LP turbine ACC mechanism 242 uses the ACC fluid flow 264B to control and optimize clearance gaps associated with the LP turbine 134.

Figure 8:
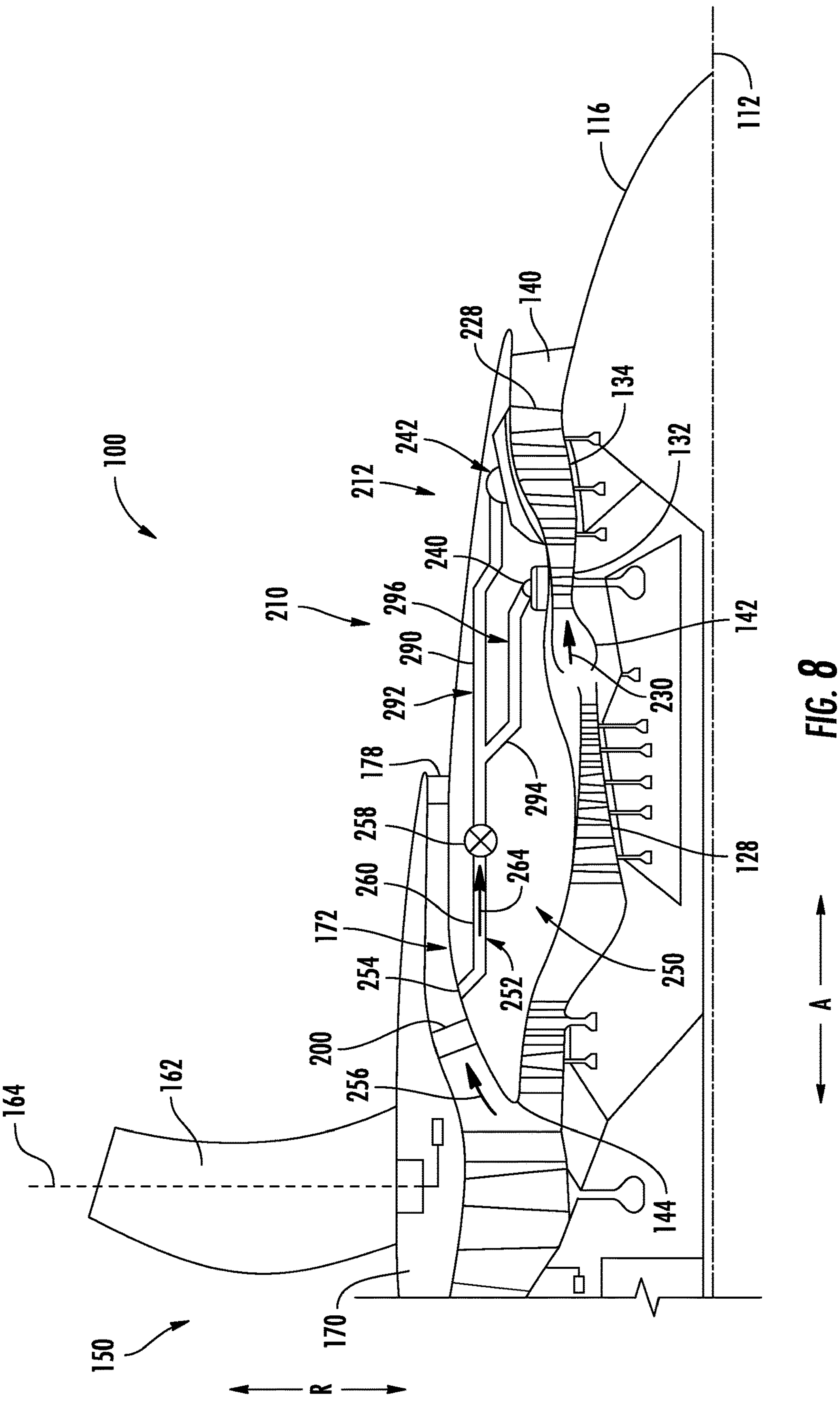
FIG. 8 is a schematic view of another exemplary ACC assembly according to various embodiments of the present disclosure.

Referring now to FIG. 8, FIG. 8 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 2 such that the air supply inlet 254 is located downstream in the fan duct 172 from the heat exchanger 200, and the air supply inlet 254 is fluidly connected to the flow control device 258 located downstream of the air supply inlet 254 in the ACC flow path 252. In FIG. 8, the flow control device 258 is fluidly connected to the LP turbine ACC mechanism 242 by a line 290. Line 290 defines in part a first portion 292 of the ACC flowpath 252 such that the line 290 is fluidly connected to the LP turbine ACC mechanism 242. The LP turbine ACC mechanism 242 is downstream from the flow control device 258 in the first portion 292 of the ACC flowpath 252. A line 294 is fluidly connected to the line 290 downstream of the flow control device 258 in the ACC flowpath 252. Line 294 defines in part a second portion 296 the ACC flowpath 252 such that the line 294 is fluidly connected to the HP turbine ACC mechanism 240 where the HP turbine ACC mechanism 240 is downstream from the flow control device 258 in the second portion 296 of the ACC flowpath 252.

During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. The flow control device 258 controls the volume of the ACC fluid flow 264 delivered to the HP turbine ACC mechanism 240 and the LP turbine ACC mechanism 242.

Figure 9:
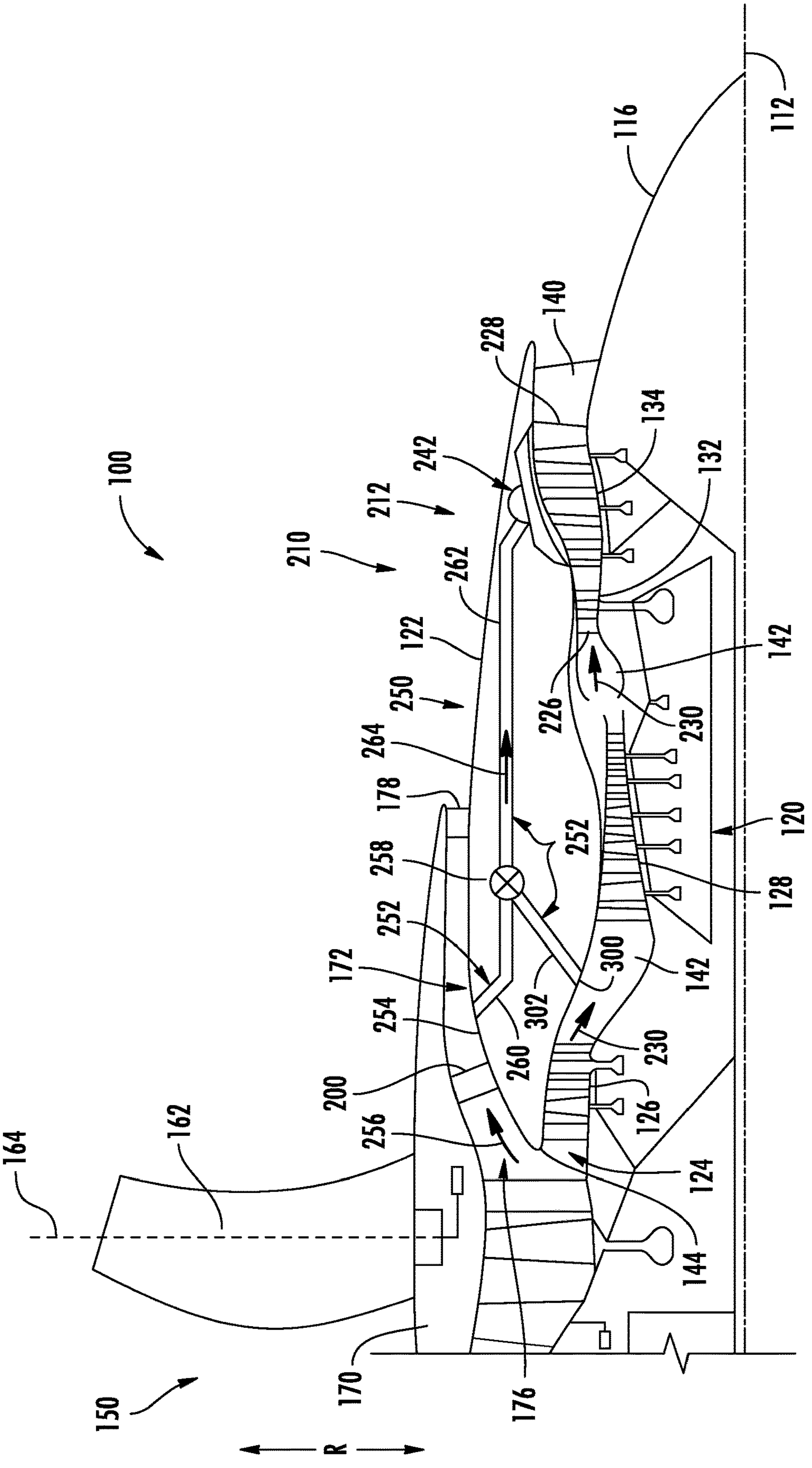
FIG. 9 is a schematic view of another exemplary ACC assembly according to various embodiments of the present disclosure.

Referring now to FIG. 9, FIG. 9 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 2 such the air supply inlet 254 is located downstream in the fan duct 172 from the heat exchanger 200, and the air supply inlet 254 is fluidly connected to the flow control device 258 located downstream of the air supply inlet 254 in the ACC flow path 252.

In the illustrated embodiment, the flow control device 258 is fluidly connected to the core duct 142 at the compressor section of the turbomachine 120. For example, in the illustrated embodiment, the flow control device 258 is fluidly connected to the core duct 142 at an air supply inlet 300 axially located downstream of the LP compressor 126 and upstream of the HP compressor 128. In some embodiments, the air supply inlet 300 is located aft of a final stage of the LP compressor 126. However, it should be appreciated that the air supply inlet 300 may be located elsewhere within the compressor section of the turbomachine 120. The flow control device 258 is fluidly connected to the air supply inlet 300 by a line 302. Line 302 defines in part the ACC flowpath 252 such that the line 302 is fluidly connected to the flow control device 258 such that the flow control device 258 is located downstream from the air supply inlet 300 in the ACC flowpath 252.

The flow control device 258 controls and/or regulates the volume of ACC fluid flow 264 delivered to the LP turbine ACC mechanism 242. Further, the flow control device 258 controls and/or regulates a source of the ACC fluid flow 264. For example, the flow control device 258 may be a valve operable to select a source of the ACC fluid flow as the fan duct 172 or the core duct 142. During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. Alternatively, a portion of a core airflow 230 is extracted from the core duct 142 (e.g., by a scoop or other type of mechanism) and directed or routed into the air supply inlet 300 as the ACC fluid flow 264. The flow control device 258 controls the volume of the ACC fluid flow 264 delivered to the LP turbine ACC mechanism 242. The LP turbine ACC mechanism 242 uses the ACC fluid flow 264 to control and optimize clearance gaps associated with the LP turbine 134.

Figure 10:
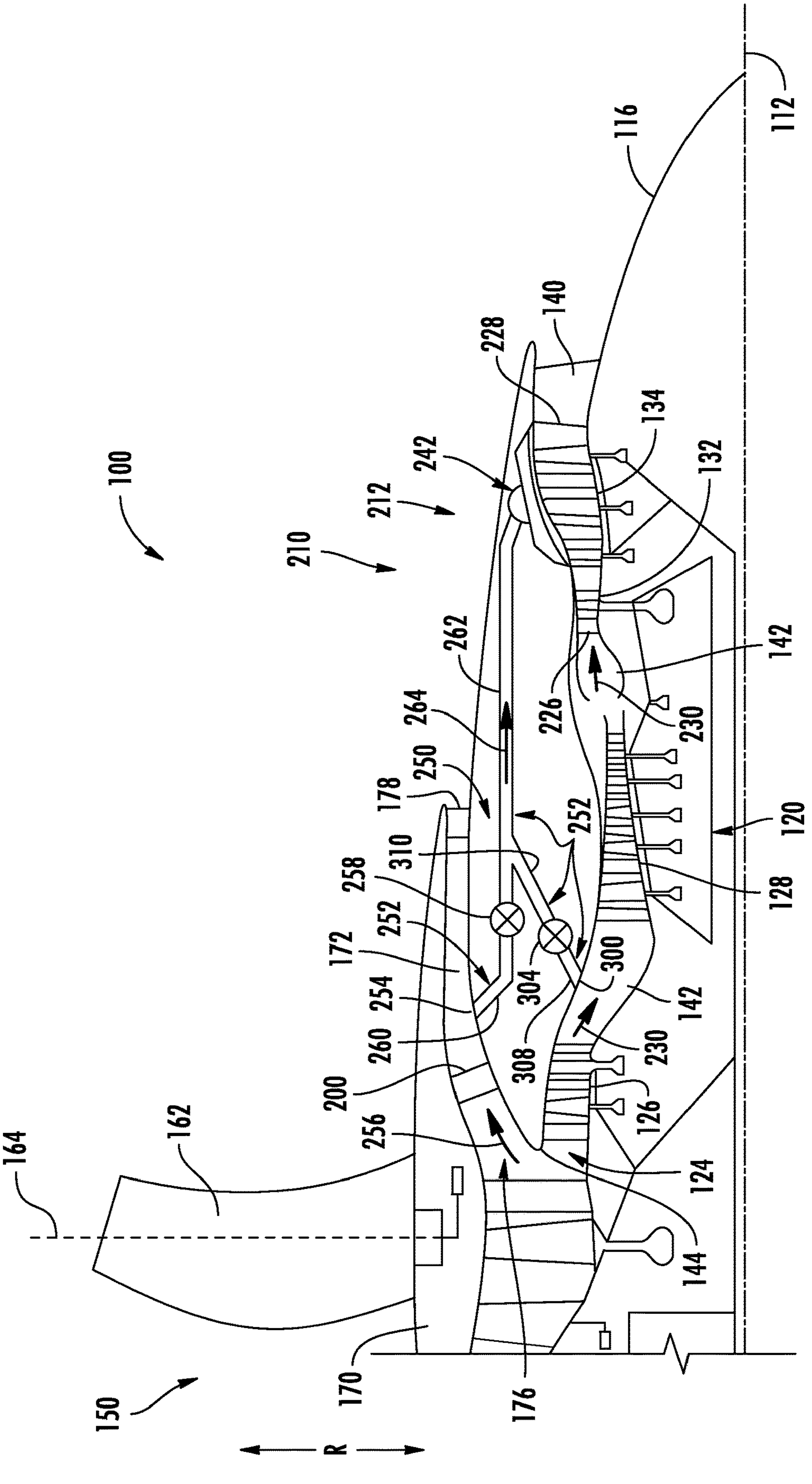
FIG. 10 is a schematic view of another exemplary ACC assembly according to various embodiments of the present disclosure.

Referring now to FIG. 10, FIG. 10 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 2 such the air supply inlet 254 is located downstream in the fan duct 172 from the heat exchanger 200, and the air supply inlet 254 is fluidly connected to the flow control device 258 located downstream of the air supply inlet 254 via the line 260 in the ACC flow path 252.

In the illustrated embodiment, a flow control device 304 is fluidly connected to the core duct 142 at the compressor section of the turbomachine 120. For example, in the illustrated embodiment, the flow control device 304 is fluidly connected to the core duct 142 at an air supply inlet 300 axially located downstream of the LP compressor 126 and upstream of the HP compressor 128. In some embodiments, the air supply inlet 300 is located aft of a final stage of the LP compressor 126. However, it should be appreciated that the air supply inlet 300 may be located elsewhere within the compressor section of the turbomachine 120. The flow control device 304 is fluidly connected to the air supply inlet 300 by a line 308. Line 308 defines in part the ACC flowpath 252 such that the line 308 is fluidly connected to the flow control device 304 such that the flow control device 304 is located downstream from the air supply inlet 300 in the ACC flowpath 252. The flow control device 304 is fluidly connected to the line 262 by a line 310. Line 310 defines in part the ACC flowpath 252 such that the line 310 is fluidly connected to the flow control device 304 such that the line 310 is located downstream of the flow control device 304 in the ACC flowpath 252. Further, line 310 is fluidly connected to the line 262 downstream of the flow control devices 258 and 304 in the ACC flowpath 252.

The flow control devices 258 and 304 control and/or regulate the volume of ACC fluid flow 264 delivered to the LP turbine ACC mechanism 242. Further, the flow control devices 258 and 304 control and/or regulate a source of the ACC fluid flow 264. For example, the flow control device 258 may be a valve operable to select a source of the ACC fluid flow 264 as the fan duct 172, and the flow control device 304 may be a valve operable to select a source of the ACC fluid flow 264 as the core duct 142. During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. Alternatively or in combination therewith, a portion of the core airflow 230 is extracted from the core duct 142 (e.g., by a scoop or other type of mechanism) and directed or routed into the air supply inlet 300 as the ACC fluid flow 264. The flow control device

304 controls the volume of the ACC fluid flow 264 delivered to the LP turbine ACC mechanism 242. The LP turbine ACC mechanism 242 uses the ACC fluid flow 264 to control and optimize clearance gaps associated with the LP turbine 134.

Figure 11:
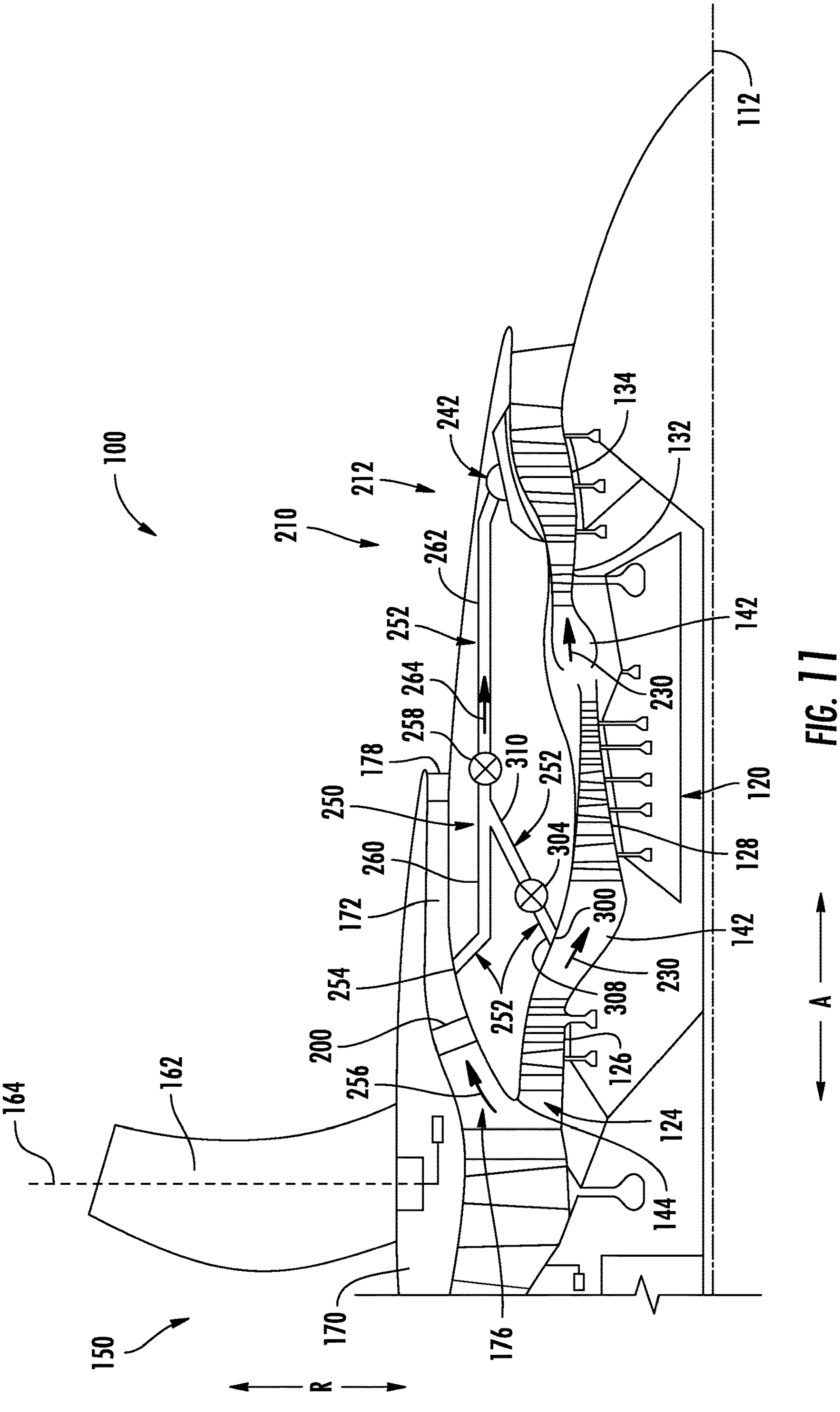
FIG. 11 is a schematic view of another exemplary ACC assembly according to various embodiments of the present disclosure.

Referring now to FIG. 11, FIG. 11 is a schematic view of another embodiment of the ACC assembly 210 for a gas turbine engine 100 in accordance with the present disclosure. The gas turbine engine 100 may be configured in a similar manner as the exemplary gas turbine engine 100 of FIG. 1. In the illustrated embodiment, the ACC assembly 210 is configured similarly to the embodiment depicted in FIG. 10 such the air supply inlet 254 is located downstream in the fan duct 172 from the heat exchanger 200, and the air supply inlet 254 is fluidly connected to the flow control device 258 located downstream of the air supply inlet 254 via the line 260 in the ACC flow path 252. Also, the flow control device 304 is fluidly connected to the core duct 142 at the compressor section of the turbomachine 120. The flow control device 304 is fluidly connected to the core duct 142 at an air supply inlet 300 axially located downstream of the LP compressor 126 and upstream of the HP compressor 128. In the illustrated embodiment, the air supply inlet 300 is located aft of a final stage of the LP compressor 126. However, it should be appreciated that the air supply inlet 300 may be located elsewhere within the compressor section of the turbomachine 120. The flow control device 304 is fluidly connected to the air supply inlet 300 by the line 308 such that the flow control device 304 is located downstream from the air supply inlet 300 in the ACC flowpath 252. The flow control device 304 is fluidly connected to the line 262 by the line 310. Line 310 is fluidly connected to the flow control device 304 such that the line 310 is located downstream of the flow control device 304 in the ACC flowpath 252. In the illustrated embodiment, line 310 is fluidly connected to the line 260 upstream of the flow control devices 258 in the ACC flowpath 252.

The flow control devices 258 and 304 control and/or regulate the volume of ACC fluid flow 264 delivered to the LP turbine ACC mechanism 242. Further, the flow control devices 258 and 304 control and/or regulate a source of the ACC fluid flow 264. For example, the flow control device 304 may be a valve operable to select a source for the ACC fluid flow 264 as the core duct 142. The fluid flow from the core duct 142 may be mixed with a fluid flow from the fan duct 172 before reaching the flow control device 258. The flow control device 258 controls and/or regulates the volume of ACC fluid flow 264 delivered to the LP turbine ACC mechanism 242.

During operation of gas turbine engine 100, a portion of the fan duct airflow 256 is extracted from the fan duct 172 (e.g., by a scoop or other type of mechanism) and directed or routed into the air supply inlet 254 as the ACC fluid flow 264. A portion of the core airflow 230 may be extracted from the core duct 142 (e.g., by a scoop or other type of mechanism) and directed or routed into the air supply inlet 300 as the ACC fluid flow 264. Actuation of the flow control device 304 directs the portion of the core airflow 230 received by the air supply inlet 300 to flow downstream and mix with the fluid flow received from the air supply inlet 254. The flow control device 258 then controls the volume of the ACC fluid flow 264 resulting from the mixed fluid flows delivered to the LP turbine ACC mechanism 242. The LP turbine ACC mechanism 242 uses the ACC fluid flow 264 to control and optimize clearance gaps associated with the LP turbine 134.

In the embodiments depicted and described in FIGS. 9-11, the ACC fluid flow 264 is being delivered to the LP turbine ACC mechanism 242. It should be appreciated that in the embodiments depicted in FIGS. 9-11, the ACC fluid flow 264 may alternatively or additionally be provided to the HP turbine ACC mechanism 240.

Accordingly, embodiments of an active clearance control (ACC) assembly of the present disclosure provide cooling air from a fan duct to one or more ACC mechanisms associated with the turbine section of the engine. For example, according to exemplary embodiments of the present disclosure, cooling air provided to the ACC mechanisms from the fan duct is generally at a higher pressure. Also, providing cooling air to the ACC mechanisms from the fan duct prevents bleeding cooling air from the core airflow which may otherwise have detrimental combustion penalties.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Further aspects are provided by the subject matter of the following clauses:

A gas turbine engine, comprising: a fan section, an engine inlet, and a fan duct splitter in serial flow order, the fan duct splitter splitting an airflow entering the engine inlet from the fan section into a fan duct and a core duct, the core duct including a compressor section, a combustion section, and a turbine section in serial flow order; and a duct assembly coupled to the fan duct to extract a portion of a fan duct airflow passing through the fan duct and deliver the portion of the fan duct airflow to an active clearance control mechanism of the turbine section.

The gas turbine engine of any of the preceding clauses, wherein the fan duct comprises a heat exchanger, and wherein the duct assembly is coupled to the fan duct downstream of the heat exchanger.

The gas turbine engine of any of the preceding clauses, wherein the fan duct comprises a heat exchanger, and wherein the duct assembly is coupled to the fan duct upstream of the heat exchanger.

The gas turbine engine of any of the preceding clauses, further comprising a flow control device regulating a flow of the portion of the fan duct airflow to the active clearance control mechanism.

The gas turbine engine of any of the preceding clauses, wherein the turbine section includes a low pressure turbine, and wherein the active clearance control mechanism is operably coupled with the low pressure turbine.

The gas turbine engine of any of the preceding clauses, wherein the turbine section includes a high pressure turbine, and wherein the active clearance control mechanism is operably coupled with the high pressure turbine.

The gas turbine engine of any of the preceding clauses, wherein the turbine section includes a low pressure turbine and a high pressure turbine, and wherein the active clearance control mechanism comprises a low pressure turbine active clearance control mechanism and a high pressure turbine active clearance control mechanism.

The gas turbine engine of any of the preceding clauses, further comprising a flow control device regulating a flow of the portion of the fan duct airflow to the low pressure turbine active clearance control mechanism and the high pressure turbine active clearance control mechanism.

The gas turbine engine of any of the preceding clauses, wherein the duct assembly is further coupled to the core duct to extract a portion of a core airflow passing through the core duct and deliver the portion of the core airflow to the active clearance control mechanism of the turbine section.

The gas turbine engine of any of the preceding clauses, further comprising a flow control device regulating a flow of at least one of the portion of the fan duct airflow or the portion of the core airflow delivered to the active clearance control mechanism.

The gas turbine engine of any of the preceding clauses, wherein the active clearance control mechanism comprises a low pressure turbine active clearance control mechanism and a high pressure turbine active clearance control mechanism, and wherein the duct assembly defines a first active clearance control flow path from the fan duct to the low pressure turbine active clearance control mechanism and a second active clearance control flow path from the fan duct to the high pressure turbine active clearance control mechanism.

The gas turbine engine of any of the preceding clauses, further comprising a first flow control device within the first active clearance control flow path and a second flow control device within the second active clearance control flow path.

The gas turbine engine of any of the preceding clauses, wherein the active clearance control mechanism comprises a low pressure turbine active clearance control mechanism and a high pressure turbine active clearance control mechanism, and wherein the duct assembly comprises an air supply inlet in communication with the fan duct to supply the portion of the fan duct airflow along a first active clearance control flow path from the air supply inlet to the low pressure turbine active clearance control mechanism and from the air supply inlet to a second active clearance control flow path from the fan duct to the high pressure turbine active clearance control mechanism.

The gas turbine engine of any of the preceding clauses, further comprising a first flow control device within the first active clearance control flow path between the air supply inlet and the low pressure turbine active clearance control mechanism and a second flow control device within the second active clearance control flow path between the air supply inlet to the high pressure turbine active clearance control mechanism.

The gas turbine engine of any of the preceding clauses, wherein the duct assembly comprises a first air supply inlet in communication with the fan duct and a second air supply inlet in communication with a core duct.

The gas turbine engine of any of the preceding clauses, wherein the duct assembly defines an active clearance control flow path from the first air supply inlet to the active clearance control mechanism and from the second air supply inlet to the active clearance control mechanism.

The gas turbine engine of any of the preceding clauses, further comprising a first flow control device between the first air supply inlet and the active clearance control mechanism and a second flow control device between the second air supply inlet and the active clearance control mechanism.

The gas turbine engine of any of the preceding clauses, wherein the duct assembly comprises a first air supply inlet in communication with the fan duct and a second air supply inlet in communication with a core duct, and wherein the duct assembly comprises a first flow control device downstream of the second air supply inlet and a second flow control device downstream from the first flow control device and the first air supply inlet.

The gas turbine engine of any of the preceding clauses, wherein the first flow control device regulates of a portion of a core airflow delivered to the second flow control device from the second air supply inlet, and wherein the second flow control device regulates a flow of a portion of a fan duct airflow received from the first air supply inlet and the portion of the core airflow delivered to the active clearance control mechanism.

A method to provide clearance control for a gas turbine engine having a fan section, an engine inlet, and a fan duct splitter in serial flow order, the fan duct splitter splitting an airflow entering the engine inlet from the fan section into a fan duct and a core duct, the core duct including a compressor section, a combustion section, and a turbine section in serial flow order, the method comprising: extracting a portion of a fan duct airflow passing through the fan duct; and passing the portion of the fan duct airflow to an active clearance control mechanism of the turbine section.

The method of any of the preceding clauses, further comprising regulating a flow of the portion of the fan duct airflow to the active clearance control mechanism.

The method of any of the preceding clauses, wherein the fan duct includes a heat exchanger, and wherein extracting the portion of the fan duct airflow comprises extracting the portion of the fan duct airflow from a location of the fan duct downstream of the heat exchanger.

The method of any of the preceding clauses, wherein the fan duct includes a heat exchanger, and wherein extracting the portion of the fan duct airflow comprises extracting the portion of the fan duct airflow from a location of the fan duct upstream of the heat exchanger.

The method of any of the preceding clauses, wherein the turbine section includes a low pressure turbine and a high pressure turbine, and wherein the active clearance control mechanism comprises a low pressure turbine active clearance control mechanism and a high pressure turbine active clearance control mechanism, and further comprising regulating a flow of the portion of the fan duct airflow to the low pressure turbine active clearance control mechanism and the high pressure turbine active clearance control mechanism.

The method of any of the preceding clauses, wherein the turbine section includes a low pressure turbine and a high pressure turbine, and wherein the active clearance control mechanism comprises a low pressure turbine active clearance control mechanism and a high pressure turbine active clearance control mechanism, and further comprising passing a first part of the portion of the fan duct airflow extracted from the fan duct to the low pressure turbine active clearance control mechanism and passing a second part of the portion of the fan duct airflow extracted from the fan duct to the high pressure turbine active clearance control mechanism.

A gas turbine engine, comprising: a core cowl supporting a turbomachine, the turbomachine including a compressor section, a combustion section, and a turbine section arranged in serial flow order; a fan assembly rotatable by the turbomachine; a fan cowl encasing at least a portion of the core cowl and defining a fan duct extending between the fan cowl and the core cowl; an active clearance control mechanism operably coupled with the turbine section; and a duct assembly coupled to the fan duct to extract a portion of a fan duct airflow passing through the fan duct and deliver the portion of the fan duct airflow to the active clearance control mechanism.

The gas turbine engine of any of the preceding clauses, further comprising a heat exchanger disposed within the fan duct, and wherein the duct assembly is operably coupled to the fan duct upstream of the heat exchanger.

The gas turbine engine of any of the preceding clauses, further comprising a heat exchanger disposed within the fan duct, and wherein the duct assembly is operably coupled to the fan duct downstream of the heat exchanger.

The gas turbine engine of any of the preceding clauses, further comprising a flow control device regulating a flow of the portion of the fan duct airflow to the active clearance control mechanism.

What is claimed is:

1. A gas turbine engine, comprising:

a fan section, an engine inlet, and a fan duct splitter in serial flow order, the fan duct splitter splitting an airflow entering the engine inlet from the fan section into a fan duct and a core duct, the core duct including a compressor section, a combustion section, and a turbine section in serial flow order, the compressor section including a low pressure compressor and a high pressure compressor;

a duct assembly coupled to the fan duct via a first air supply inlet and to the core duct via a second air supply inlet to extract a portion of a fan duct airflow passing through the fan duct and a portion of a core airflow passing through the core duct at a location downstream of the low pressure compressor and upstream of the high pressure compressor, the duct assembly configured to deliver the portion of the fan duct airflow and the portion of the core airflow to an active clearance control mechanism of the turbine section; and a valve fluidly coupled to the fan duct and the core duct, wherein the valve is disposed at an intersection of a first line which receives the portion of the fan duct airflow from the first air supply inlet, a second line which receives the portion of the core airflow from the second air supply inlet, and a third line which provides the portion of the fan duct airflow and the portion of the core airflow to the active clearance control mechanism, and wherein the valve is configured to deliver only the portion of the fan duct airflow or only the portion of the core airflow to the active clearance control mechanism.

2. The gas turbine engine of claim 1, wherein the fan duct comprises a heat exchanger, and wherein the duct assembly is coupled to the fan duct downstream of the heat exchanger.

3. The gas turbine engine of claim 1, wherein the fan duct comprises a heat exchanger, and wherein the duct assembly is coupled to the fan duct upstream of the heat exchanger.

4. The gas turbine engine of claim 1, wherein the turbine section includes a low pressure turbine, and wherein the active clearance control mechanism is operably coupled with the low pressure turbine.

5. The gas turbine engine of claim 1, wherein the turbine section includes a high pressure turbine, and wherein the active clearance control mechanism is operably coupled with the high pressure turbine.

6. The gas turbine engine of claim 1, wherein the turbine section includes a low pressure turbine and a high pressure turbine, and wherein the active clearance control mechanism comprises a low pressure turbine active clearance control mechanism and a high pressure turbine active clearance control mechanism.

7. The gas turbine engine of claim 6, further comprising the valve regulating a flow of the portion of the fan duct airflow to the low pressure turbine active clearance control mechanism and the high pressure turbine active clearance control mechanism.

8. A method to provide clearance control for a gas turbine engine having a fan section, an engine inlet, and a fan duct splitter in serial flow order, the fan duct splitter splitting an airflow entering the engine inlet from the fan section into a fan duct and a core duct, the core duct including a compressor section, a combustion section, and a turbine section in serial flow order, the compressor section including a low pressure compressor and a high pressure compressor, the method comprising:

extracting a portion of a fan duct airflow passing through the fan duct and a portion of a core airflow passing through the core duct at a location downstream of the low pressure compressor and upstream of the high pressure compressor;

delivering either the portion of the fan duct airflow or the portion of the core airflow delivered to an active clearance control mechanism of the turbine section using a valve, wherein the valve is disposed at an intersection of a first line which receives the portion of the fan duct airflow, a second line which receives the portion of the core airflow, and a third line which provides the portion of the fan duct airflow and the portion of the core airflow to the active clearance control mechanism; and passing only the portion of the fan duct airflow or only the portion of the core airflow to the active clearance control mechanism of the turbine section.

9. The method of claim 8, wherein the fan duct includes a heat exchanger, and wherein extracting the portion of the fan duct airflow comprises extracting the portion of the fan duct airflow from a location of the fan duct downstream of the heat exchanger.

10. The method of claim 8, wherein the fan duct includes a heat exchanger, and wherein extracting the portion of the fan duct airflow comprises extracting the portion of the fan duct airflow from a location of the fan duct upstream of the heat exchanger.

11. The method of claim 8, wherein the turbine section includes a low pressure turbine and a high pressure turbine, and wherein the active clearance control mechanism comprises a low pressure turbine active clearance control mechanism and a high pressure turbine active clearance control mechanism, and further comprising regulating a flow of the portion of the fan duct airflow to the low pressure turbine active clearance control mechanism and the high pressure turbine active clearance control mechanism.

12. The method of claim 8, wherein the turbine section includes a low pressure turbine and a high pressure turbine, and wherein the active clearance control mechanism comprises a low pressure turbine active clearance control mechanism and a high pressure turbine active clearance control mechanism, and further comprising passing a first part of the portion of the fan duct airflow extracted from the fan duct to the low pressure turbine active clearance control mechanism and passing a second part of the portion of the fan duct airflow extracted from the fan duct to the high pressure turbine active clearance control mechanism.

13. A gas turbine engine, comprising:

a core cowl supporting a turbomachine, the turbomachine including a compressor section, a combustion section, and a turbine section arranged in serial flow order, the compressor section including a low pressure compressor and a high pressure compressor;

a fan assembly rotatable by the turbomachine;

a fan cowl encasing at least a portion of the core cowl and defining a fan duct extending between the fan cowl and the core cowl, the core cowl defining a core duct;

an active clearance control mechanism operably coupled with the turbine section;

a duct assembly coupled to the fan duct via a first air supply inlet and to the core duct via a second air supply inlet to extract a portion of a fan duct airflow passing through the fan duct and a portion of a core airflow passing through the core duct at a location downstream of the low pressure compressor and upstream of the high pressure compressor, the duct assembly configured to deliver the portion of the fan duct airflow and the portion of the core airflow to the active clearance control mechanism; and a valve fluidly coupled to the fan duct and the core duct, wherein the valve is disposed at an intersection of a first line which receives the portion of the fan duct airflow from the first air supply inlet, a second line which receives the portion of the core airflow from the second air supply inlet, and a third line which provides the portion of the fan duct airflow and the portion of the core airflow to the active clearance control mechanism, and wherein the valve is configured to deliver only the portion of the fan duct airflow or only the portion of the core airflow to the active clearance control mechanism.

14. The gas turbine engine of claim 13, further comprising a heat exchanger disposed within the fan duct, and wherein the duct assembly is operably coupled to the fan duct upstream of the heat exchanger.

15. The gas turbine engine of claim 13, further comprising a heat exchanger disposed within the fan duct, and wherein the duct assembly is operably coupled to the fan duct downstream of the heat exchanger.

* * * * *